(12) United States Patent
Mita

(10) Patent No.: US 11,898,850 B2
(45) Date of Patent: Feb. 13, 2024

(54) VEHICLE POSITION DETECTION DEVICE AND PARAMETER SET CREATION DEVICE FOR VEHICLE POSITION DETECTION

(71) Applicant: Hitachi Astemo, Ltd., Hitachinaka (JP)

(72) Inventor: Ryota Mita, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 183 days.

(21) Appl. No.: 17/603,697

(22) PCT Filed: Apr. 24, 2020

(86) PCT No.: PCT/JP2020/017631
§ 371 (c)(1),
(2) Date: Oct. 14, 2021

(87) PCT Pub. No.: WO2020/226071
PCT Pub. Date: Nov. 12, 2020

(65) Prior Publication Data
US 2022/0236063 A1    Jul. 28, 2022

(30) Foreign Application Priority Data
May 8, 2019    (JP) .................. 2019-088042

(51) Int. Cl.
*G01C 21/28*    (2006.01)
*G07C 5/08*    (2006.01)
*B60W 60/00*    (2020.01)

(52) U.S. Cl.
CPC ............. *G01C 21/28* (2013.01); *G07C 5/085* (2013.01); *B60W 60/001* (2020.02)

(58) Field of Classification Search
CPC ..... G01C 21/28; G07C 5/085; B60W 60/001; B60W 2556/60; G01S 19/11; G01S 19/14; G01S 19/49; G08G 1/0969
See application file for complete search history.

(56) References Cited

U.S. PATENT DOCUMENTS 5,334,986 A * 8/1994 Fernhout ............... G01S 19/40
                                                          342/357.31
2002/0099481 A1* 7/2002 Mori ..................... G05D 1/027
                                                          318/587

(Continued)

FOREIGN PATENT DOCUMENTS

JP    2004-271293 A    9/2004
JP    2013-073338 A    4/2013

(Continued)

OTHER PUBLICATIONS

International Search Report with English translation and Written Opinion issued in corresponding application No. PCT/JP2020/017631 dated Sep. 1, 2020.

*Primary Examiner* — Donald J Wallace
(74) *Attorney, Agent, or Firm* — Foley & Lardner LLP

(57) ABSTRACT

It is possible to reduce inadvertent vehicle behavior during autonomous driving. A vehicle position detection device includes: a satellite positioning position calculation unit 15 that receives a satellite positioning position signal of a vehicle and calculates a satellite positioning position of the vehicle; an autonomous navigation position calculation unit 16 that receives an autonomous navigation position signal of the vehicle and calculates an autonomous navigation position of the vehicle; a distance calculation unit 17 that calculates a positional difference between the satellite positioning position and the autonomous navigation position; a recording unit that stores a plurality of parameter sets in which a plurality of thresholds for allowing a positional difference for each speed of the vehicle are set per vehicle characteristic; a selection unit 14 that selects a parameter set according to the vehicle characteristic from a plurality of parameter sets 11 to 13 stored in the recording unit; and a determination unit 18 that outputs the satellite positioning position when the positional difference is within the thresh- (Continued)

old, and outputs the autonomous navigation position when the positional difference is out of the threshold.

6 Claims, 7 Drawing Sheets

(56) References Cited

U.S. PATENT DOCUMENTS

| | | | |
|---|---|---|---|
| 2004/0107072 A1* | 6/2004 | Dietrich | G01S 19/49 |
| | | | 342/357.32 |
| 2004/0210387 A1* | 10/2004 | Friedrichs | G01C 21/34 |
| | | | 340/995.12 |
| 2007/0260397 A1* | 11/2007 | Kurata | G01C 21/28 |
| | | | 701/489 |
| 2014/0365117 A1 | 12/2014 | Okamura et al. | |
| 2017/0336515 A1 | 11/2017 | Hosoya et al. | |
| 2018/0039284 A1 | 2/2018 | Hitosugi et al. | |
| 2019/0249996 A1* | 8/2019 | Westendorf | G01S 19/42 |
| 2020/0298836 A1* | 9/2020 | Kim | B60W 40/105 |
| 2021/0179142 A1* | 6/2021 | Horibe | B60W 60/00184 |
| 2021/0215485 A1 | 7/2021 | Ishigami et al. | |

FOREIGN PATENT DOCUMENTS

| | | |
|---|---|---|
| JP | 2013-122406 A | 6/2013 |
| JP | 2017-003395 A | 1/2017 |
| JP | 2017-211193 A | 11/2017 |
| JP | 2018-021834 A | 2/2018 |
| JP | 2019-113956 A | 7/2019 |
| WO | WO-2018/138904 A1 | 8/2018 |

* cited by examiner

FIG. 6
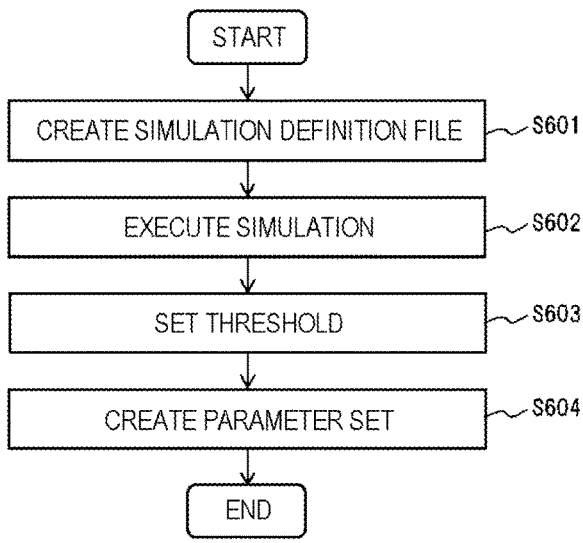
FIG. 7
| NUMBER 701 | SEGMENT 702 | CONTENT 703 |
|---|---|---|
| 1 | INITIAL SETTING | INITIALIZE SIMULATION, START RECORDING LOG DATA |
| 2 | TRAVELING | SET DRIVER MODEL (SPEED, LANE, ETC.) |
| 3 | AUTONOMOUS DRIVING MODE SWITCHING | SET AUTONOMOUS DRIVING (SPEED, ROUTE, ETC.) |
| 4 | APPLICATION OF POSITION JUMP | SET POSITION JUMP (DISTANCE, ANGLE, START/END TIMING, ETC.) |
| 5 | STOP VEHICLE | SET DRIVER MODEL |
| 6 | END | SAVE LOG DATA |
FIG. 8
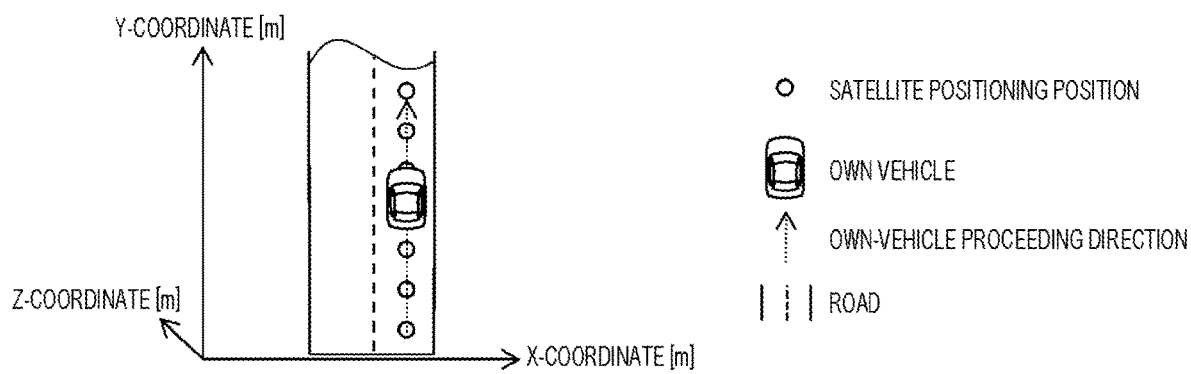

FIG. 9
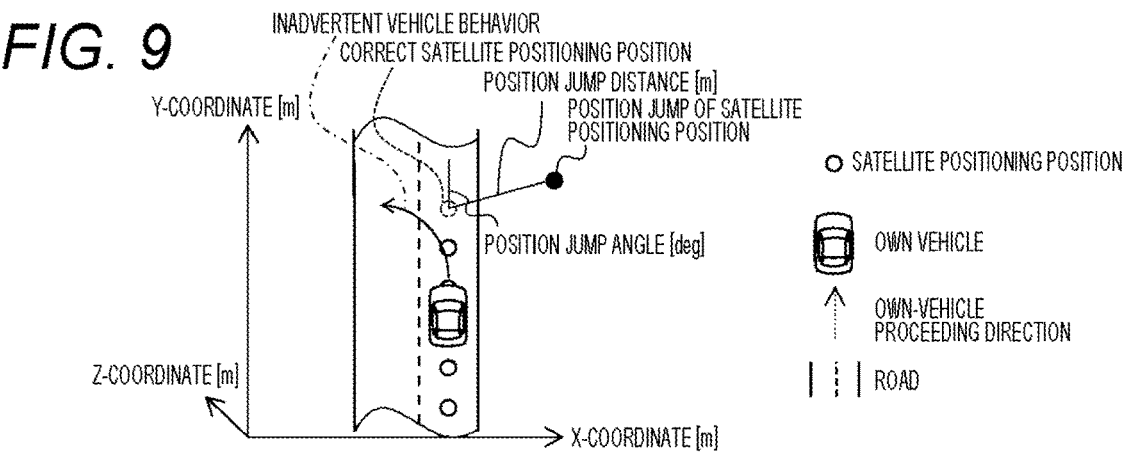
FIG. 10
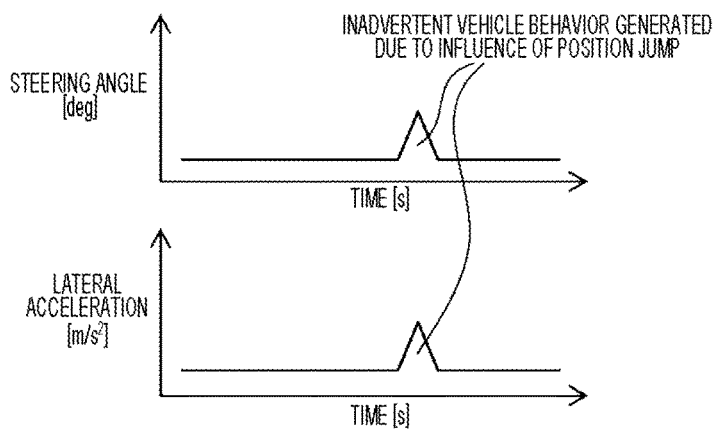
FIG. 11
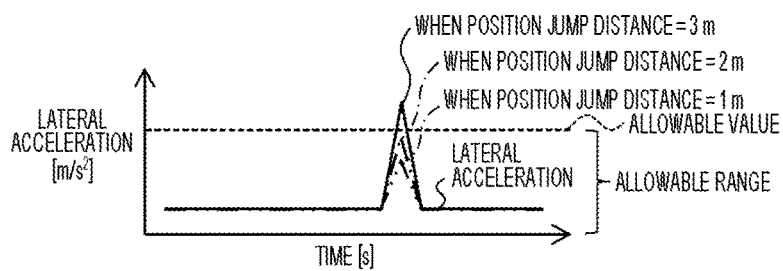
FIG. 12
| VEHICLE CHARACTERISTIC | VEHICLE SPEED | POSITION JUMP DETERMINATION THRESHOLD | |
|---|---|---|---|
| | | ANGLE [deg] | DISTANCE [m] |
| A | 5 TO 15 | +45 TO −45 | 1 |
| | | +135 TO +45 | 1 |
| | | −135 TO −45 | 1 |
| | | +135 TO −135 | 1 |
| | 15 TO 25 | +45 TO −45 | 2 |
| | | +135 TO +45 | 2 |
| | | −135 TO −45 | 2 |
| | | +135 TO −135 | 2 |
| | 25 TO 35 | +45 TO −45 | 3 |
| | | +135 TO +45 | 3 |
| | | −135 TO −45 | 3 |
| | | +135 TO −135 | 3 |

VEHICLE POSITION DETECTION DEVICE AND PARAMETER SET CREATION DEVICE FOR VEHICLE POSITION DETECTION

TECHNICAL FIELD

The present invention relates to a vehicle position detection device and a parameter set creation device for vehicle position detection.

BACKGROUND ART

In recent years, autonomous driving of a vehicle (hereinafter, also referred to as a self-driving vehicle) equipped with an autonomous driving control system has been put to practical use. The self-driving vehicle travels along a target travel route calculated based on high-precision own-vehicle position information acquired from a satellite and high-precision map information. However, when a "position jump" in which position data acquired from the satellite greatly changes by being affected by the surrounding environment of the vehicle occurs, the steering of the self-driving vehicle suddenly changes, and thus, there is a known problem that the vehicle behavior becomes unstable.

PTL 1 discloses a technique of comparing a positional difference between a satellite positioning position and an autonomous navigation position with a determination threshold, selecting the satellite positioning position as an own-vehicle position when the positional difference is allowable, and selecting the autonomous navigation position as the own-vehicle position when the positional difference is unacceptable.

Further, PTL 1 also discloses a technique of increasing the determination threshold as the detection time of the "position jump" becomes longer in order to solve a problem that a deviation of the own-vehicle position is not corrected at all when the "position jump" continues.

Further, PTL 2 discloses a technique of storing an allowable range of a difference between a satellite positioning position and an autonomous navigation position as a threshold table for each speed of a vehicle and switching the threshold for each vehicle speed.

CITATION LIST

Patent Literature

PTL 1: JP 2018-021834 A
PTL 2: JP 2004-271293 A

SUMMARY OF INVENTION

Technical Problem

First, the behavior of the self-driving vehicle differs for each characteristic (referred to as vehicle characteristic) of the self-driving vehicle. Therefore, it is also necessary to consider vehicle characteristics when the position jump of the satellite positioning position occurs so that the steering of the self-driving vehicle suddenly changes and the vehicle behavior becomes unstable. For example, a vehicle having a light vehicle weight easily swings in the lateral direction during traveling as compared with a vehicle having a heavy vehicle weight. It is necessary to reduce a threshold for determination of the position jump as a vehicle has a lighter vehicle weight in order to suppress the sudden steering of the self-driving vehicle affected by the position jump.

In the technique of PTL 1, however, the threshold for the position jump determination is just increased as the detection time in own-vehicle position correction processing becomes longer, the larger, and there is no consideration on the vehicle characteristics. Further, in the technique of PTL 2, the threshold for the position jump determination is just changed for each speed, and there is no consideration on the vehicle characteristics.

Next, conceivable is a method of creating a threshold for a position jump determination of a satellite positioning position by analyzing a relationship among the position jump, autonomous driving control, vehicle behavior, and the like based on traveling test data of a prototype self-driving vehicle. Since the position jump occurs accidentally in accordance with the surrounding environment of the own vehicle, such as a reflected wave (multipath) due to a building or an obstacle, it has been difficult to acquire necessary test data. Further, since the traveling test is repeated with the prototype self-driving vehicle, the burden on cost and man-hours is great.

Further, a method of utilizing an autonomous driving simulator instead of a self-driving vehicle as an actual vehicle is also conceivable. The autonomous driving simulator is a bench evaluation environment in which a state where a vehicle equipped with an autonomous driving control system autonomously travels on a road is reproduced by simulation. In order to utilize the autonomous driving simulator, it is necessary to connect a vehicle position detection device as an actual machine and an autonomous driving electronic control unit (ECU) as an actual machine to the autonomous driving simulator, reproduce the autonomous driving by simulation, and acquire traveling test data.

However, there are a problem that it is difficult to transmit a satellite reception signal of a global navigation satellite system (hereinafter, also referred to as GNSS) from the autonomous driving simulator to the vehicle position detection device and a problem that it is difficult to cause a gyro sensor to react.

That is, it is necessary to set the satellite reception signal of the GNSS to be receivable by a GNSS reception unit (antenna unit) of the vehicle position detection device by converting and modulating position information of the autonomous driving simulator. Further, the gyro sensor is mounted on a substrate of the vehicle position detection device, and thus, it is necessary to arrange the vehicle position detection device on a rotation base or the like and rotate the vehicle position detection device to cause the gyro sensor to react. Both the GNSS and the gyro sensor need to be moved in synchronization with the virtual world of the autonomous driving simulator, and there are various problems for realizing the autonomous driving simulator.

An object of the present invention is to provide a technique capable of reducing inadvertent vehicle behavior during autonomous driving.

Solution to Problem

A vehicle position detection device according to the present invention includes: a satellite positioning position calculation unit that receives a satellite positioning position signal of a vehicle and calculates a satellite positioning position of the vehicle; an autonomous navigation position calculation unit that receives an autonomous navigation position signal of the vehicle and calculates an autonomous navigation position of the vehicle; a positional difference calculation unit that calculates a positional difference between the satellite positioning position and the autonomous navigation position; a recording unit that stores a plurality of parameter sets in which a plurality of thresholds for allowing the positional difference for each speed of the vehicle are set per vehicle characteristic; a selection unit that selects a parameter set corresponding to the vehicle characteristic from the plurality of parameter sets stored in the recording unit; and a determination unit that outputs the satellite positioning position when the positional difference is within a threshold, and outputs the satellite positioning position when the positional difference is out of the threshold.

Advantageous Effects of Invention

According to the present invention, it is possible to reduce the inadvertent vehicle behavior during the autonomous driving.

BRIEF DESCRIPTION OF DRAWINGS

FIG. 6 is a flowchart illustrating parameter set creation processing.

FIG. 7 is a scenario table illustrating a content of a simulated scenario.

FIG. 8 is a view illustrating autonomous driving travel reproduced by a simulator.

FIG. 9 is a view illustrating a position jump of the autonomous driving travel reproduced by the simulator.

FIG. 10 is a view schematically illustrating a relationship between a steering angle and a lateral acceleration.

FIG. 11 is a view schematically illustrating a position jump distance and a lateral acceleration when the position jump occurs.

FIG. 12 is a parameter set table.

DESCRIPTION OF EMBODIMENTS

Hereinafter, a vehicle position detection device and a parameter set creation device for vehicle position detection according to several embodiments will be described in detail with reference to the drawings. It should be noted that the embodiments are merely examples for realizing the present invention and do not limit a technical scope of the present invention. In the respective drawings, the same reference signs are assigned to the common configurations.

Before describing the vehicle position detection device and a computer as an example of the "parameter set creation device for vehicle position detection" according to the embodiments of the present invention, a configuration example of a self-driving vehicle will be described.

Figure 1:
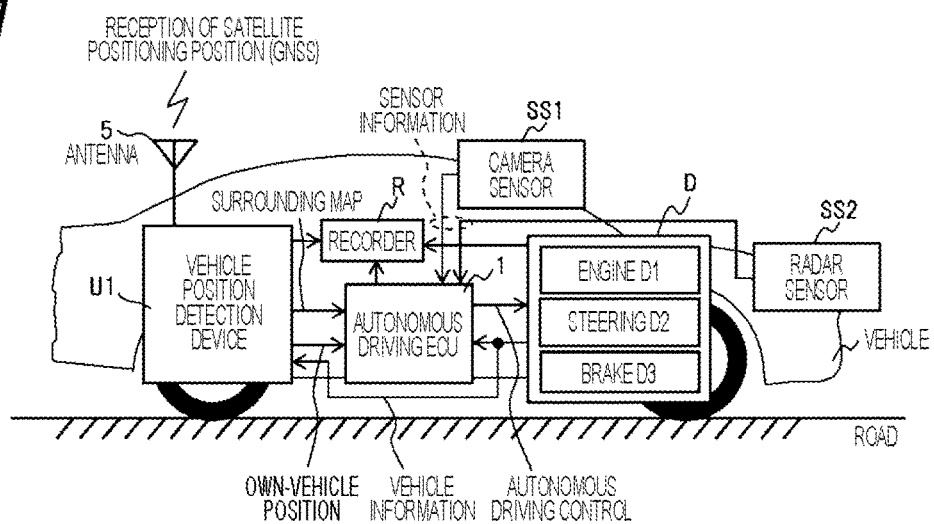
FIG. 1 is a configuration diagram of a self-driving vehicle.

FIG. 1 is a configuration diagram of the self-driving vehicle.

An autonomous driving control system is mounted on the self-driving vehicle as an example of a "vehicle" as an actual vehicle illustrated in FIG. 1. The autonomous driving control system includes an autonomous driving electronic control unit (ECU) 1, a vehicle position detection device U1, various sensors SS, various vehicle control units D, and a recording unit R.

The autonomous driving ECU 1 sets each operation amount of an engine D1, a steering D2, and a brake D3 controlled by the vehicle control units D.

The vehicle position detection device U1 includes an antenna 5. The antenna 5 receives a satellite reception signal (hereinafter, GNSS signal) of a global navigation satellite system (hereinafter, GNSS). The vehicle position detection device U1 calculates own-vehicle position information based on the received GNSS signal, selects surrounding map information from a map database to be described later, and outputs the own-vehicle position information and the surrounding map information to the autonomous driving ECU 1.

The sensors SS include a camera sensor SS1 and a radar sensor SS2. The camera sensor SS1 acquires an image around the self-driving vehicle as image information (sensor information), and outputs the acquired image information to the autonomous driving ECU 1. The radar sensor SS2 acquires a distance to a predetermined point around the self-driving vehicle as distance information (sensor information), and outputs the acquired distance information to the autonomous driving ECU 1.

The vehicle control unit D acquires vehicle information, such as driving information of the engine D1, operation information of the steering D2, and operation information of the brake D3, and outputs the acquired vehicle information to the autonomous driving ECU 1 and the vehicle position detection device U1.

The recording unit R is a recording medium provided in a personal computer (hereinafter, PC) or the like, and stores measurement data and log data of the autonomous driving control system.

Parts other than the autonomous driving ECU 1 and the vehicle position detection device U1 are simulated by an autonomous driving simulator.

Figure 2:
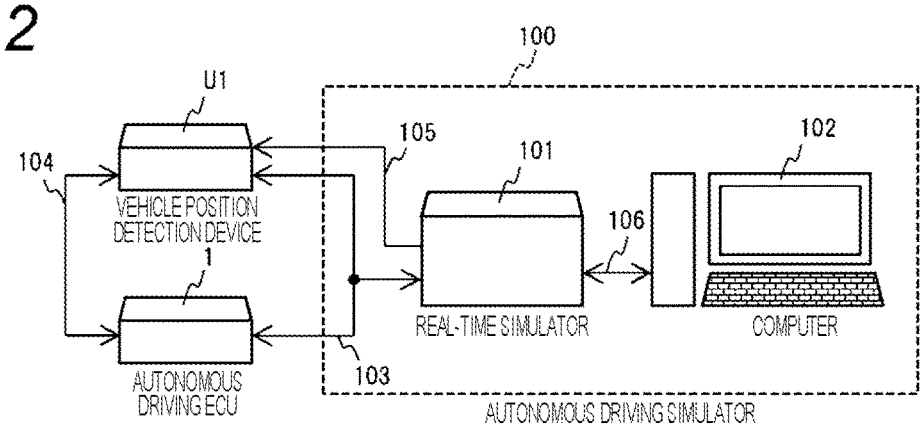
FIG. 2 is a connection diagram of an autonomous driving simulator, an autonomous driving ECU, and a vehicle position detection device.

FIG. 2 is a connection diagram of the autonomous driving simulator, the autonomous driving ECU, and the vehicle position detection device.

The autonomous driving simulator 100 includes a real-time simulator 101 and a computer 102. The autonomous driving simulator 100 is connected with the autonomous driving ECU 1 as an actual machine and the vehicle position detection device U1, or connected with a virtual autonomous driving ECU model and a vehicle position detection device model.

Here, the autonomous driving ECU 1 as the actual machine has completed hardware design and software design, and for example, is in the stage of commercialization. The virtual autonomous driving ECU model is a model of an autonomous driving ECU created using a PC or the like. The virtual autonomous driving ECU model is a simulation model that is planned to be commercialized in the future and is created as software on a PC to verify its function.

In the following description, when the autonomous driving ECU 1 and the autonomous driving ECU model are referred to as the autonomous driving ECU 1 without distinction, the autonomous driving ECU model may also be included. In addition, when the autonomous driving ECU 1 and the autonomous driving ECU model are referred to as the vehicle position detection device U1 without distinction, the vehicle position detection device model may also be included.

The computer 102 and the real-time simulator 101 are connected via a high-speed serial bus 106. The real-time simulator 101 and the autonomous driving ECU 1 are connected via a CAN 103. The real-time simulator 101 and the vehicle position detection device U1 are connected via the CAN 103 and a serial bus 105. The autonomous driving ECU 1 and the vehicle position detection device U1 are connected via Ethernet 104.

Figure 3:
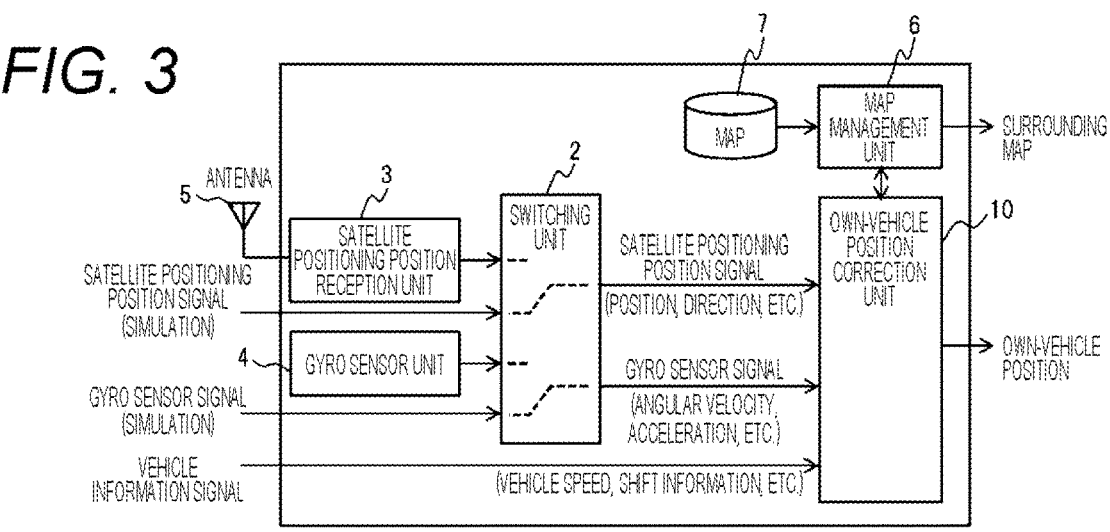
FIG. 3 is a configuration diagram of the vehicle position detection device.

FIG. 3 is a configuration example of the vehicle position detection device.

The vehicle position detection device U1 includes the antenna 5, the satellite positioning position reception unit 3, a gyro sensor unit 4, a switching unit 2, an own-vehicle position correction unit 10, a map database (hereinafter, map DB) 7, and a map management unit 6.

The antenna 5 is connected to the satellite positioning position reception unit 3 and receives the GNSS signal of the GNSS. The satellite positioning position reception unit 3 generates a satellite positioning position signal from the GNSS signal received by the antenna 5. The satellite positioning position signal may include a position, a direction, and the like of the self-driving vehicle.

The gyro sensor unit 4 is mounted on the vehicle position detection device U1 and generates a gyro sensor signal. The gyro sensor signal may include an angular velocity, an acceleration, and the like of the self-driving vehicle.

The switching unit 2 switches a signal similar to the signal output from the satellite positioning position reception unit 3 and the gyro sensor unit 4 to a signal generated outside, such as the simulator, and outputs the signal to the own-vehicle position correction unit 10.

The satellite positioning position signal, the gyro sensor signal, and a vehicle information signal (vehicle speed, shift information, and the like of the self-driving vehicle) are input to the own-vehicle position correction unit 10. The own-vehicle position correction unit 10 estimates an own-vehicle position based on the satellite positioning position signal, the gyro sensor signal, and the vehicle information signal, and outputs the own-vehicle position to the map management unit 6 and the autonomous driving ECU 1.

The map DB 7 stores map information. The map management unit 6 selects a surrounding map of the own-vehicle position from the map information of the map DB 7 in cooperation with the own-vehicle position correction unit 10, and outputs the surrounding map to the own-vehicle position correction unit 10 and the autonomous driving ECU 1.

Figure 4:
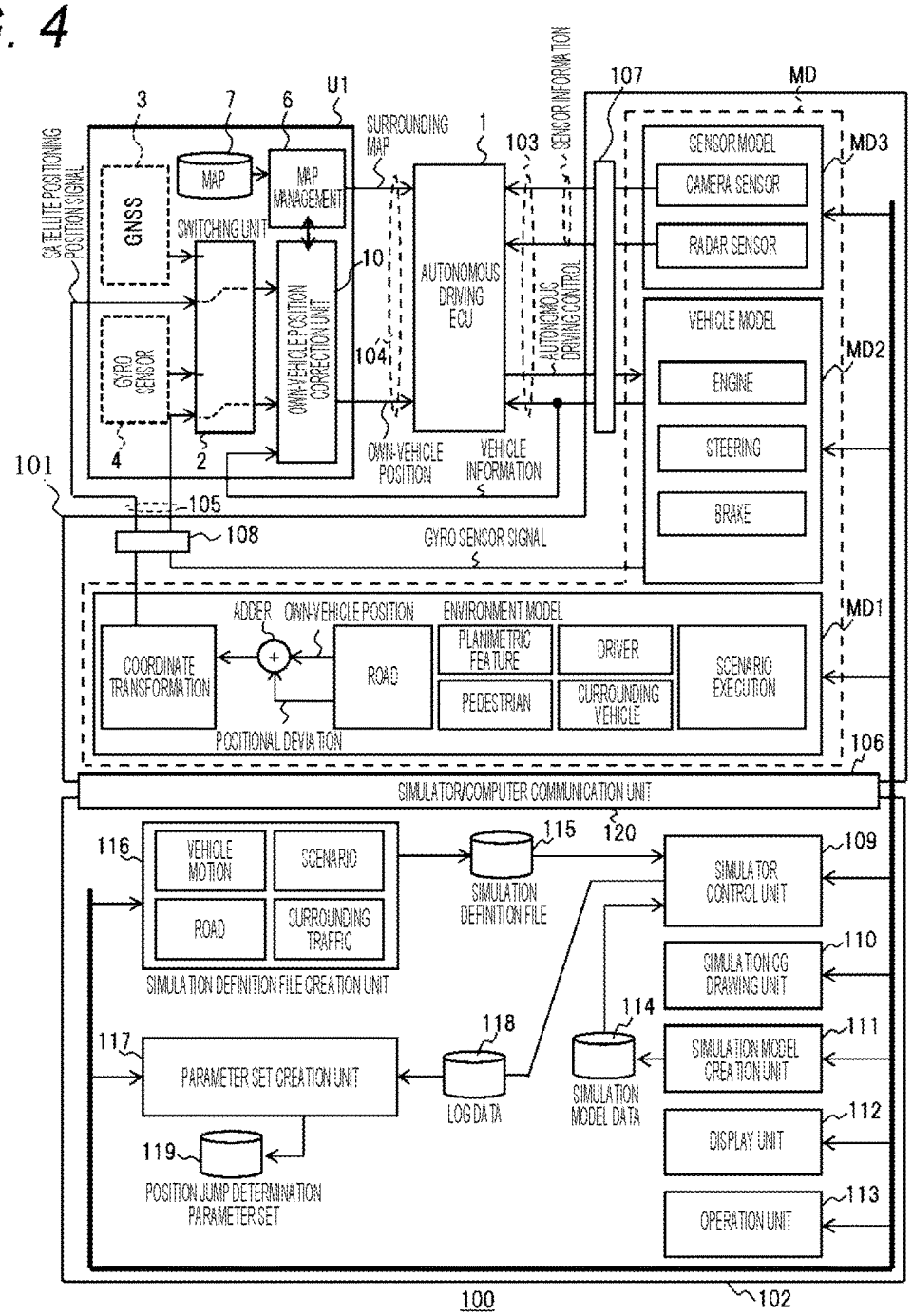
FIG. 4 is a configuration diagram of the autonomous driving simulator, the autonomous driving ECU, and the vehicle position detection device.

FIG. 4 is a configuration diagram of the autonomous driving simulator.

Here, first, a configuration and a function of the real-time simulator 101 will be described, and then, a configuration and a function of the computer 102 will be described.

In FIG. 4, the real-time simulator 101 simulates the parts other than the autonomous driving ECU 1 and the vehicle position detection device U1 of the self-driving vehicle in FIG. 1. A simulation model MD simulated by the real-time simulator 101 includes an environment model MD1, a vehicle model MD2, and a sensor model MD3.

The environment model MD1 simulates a travel environment of the vehicle. The vehicle model MD2 includes an engine section that simulates the engine D1 that is the vehicle control unit D, a steering section that simulates the steering D2, and a brake section that simulates the brake D3. The sensor model MD3 includes a camera sensor section that simulates the camera sensor SS1 and a radar sensor section that simulates the radar sensor SS2. Note that the environment model MD1 further includes a road section, a planimetric feature section, a surrounding vehicle section, a pedestrian section, a driver section, and the like that individually simulate a road, a planimetric feature, a surrounding vehicle, a pedestrian, a driver, and the like, respectively, and causes a scenario execution section to control these sections.

Configurations and functions of the models MD1 to MD3 described above are appropriately controlled or adjusted by the computer 102 to be described later. Simulator data acquired from each of the models MD1 to MD3 is output to the autonomous driving ECU 1 via an in-vehicle CAN conversion unit 107, which is a communication facility, and is also output to the vehicle position detection device U1 via a serial bus conversion unit 108.

At this time, the simulator data input to the autonomous driving ECU 1 is vehicle information from the vehicle model MD2, sensor information from the sensor model MD3, and the like. Simulation data input to the vehicle position detection device U1 is vehicle information from the vehicle model MD2, a gyro sensor signal, and a satellite positioning position signal from the environment model MD1.

Here, the satellite positioning position signal is generated by coordinate-transformation of the own-vehicle position information simulated by the road section of the environment model MD1 with a coordinate transformation unit. The satellite positioning position signal is also configured to be capable of simulating a position jump (positional deviation) at the own-vehicle position using an adder. Further, the gyro sensor signal is generated based on angular velocity information and acceleration information input from the vehicle model MD2.

The computer 102 includes various arithmetic units, a database, a display unit 112, and an operation unit 113. The arithmetic units include a simulator control unit 109, a simulation CG drawing unit 110, a simulation model creation unit 111, a simulation definition file creation unit 116 as an example of a "change unit", and a parameter set creation unit 117. The database includes a simulation model data recording unit 114, a simulation definition file 115, a log data acquisition unit 118 as an example of an "acquisition unit", and a position jump determination parameter set 119. Note that the computer 102 and the real-time simulator 101 are coupled via the high-speed serial bus 106 of a simulator-computer communication unit 120.

The simulation model creation unit 111 is software that creates simulation model data to be stored in the simulation model data recording unit 114.

The simulation definition file creation unit 116 is software that includes a vehicle motion definition section, a road definition section, a surrounding traffic definition section, and a scenario definition section, and creates the simulation definition file 115. The vehicle motion definition section is used to define the vehicle model MD2 and the sensor model MD3, and arbitrarily sets a vehicle characteristic and a sensor characteristic of the own vehicle. The road definition section is used to define the road section and the planimetric feature section of the environment model MD1, and arbitrarily sets a road and a planimetric feature in simulation. The surrounding traffic definition section is used to define the pedestrian section and the surrounding vehicle section of the environment model MD1, and sets the movement of a pedestrian and a surrounding vehicle in the simulation. The scenario definition section is used to define the driver section of the environment model MD1 and a scenario to be simulated, and controls the road section, the planimetric feature section, the surrounding vehicle section, the pedestrian section, and the driver section through the scenario execution section of the environment model MD1 according to the scenario.

Note that the vehicle characteristic is desirably a vehicle type of the vehicle. Further, the vehicle characteristic may be changed according to at least any of a vehicle body, a wheel, an engine, a brake, a suspension, a tire, a steering, and a travel environment. Specifically, the vehicle body may be the mass, rigidity, the center of gravity, a wheel base, a tread, and an air resistance of the vehicle body. The wheel may be a driving mode of the wheel and a transmission. The engine may be an output and a characteristic of the engine. The brake may be a configuration, a shape, and a braking force of the brake. The suspension may be a configuration, a shape, and a deflection of the suspension. The tire may be a configuration, a shape, grip performance, and a spring constant of the tire. The steering may be a configuration, rigidity, or a gear ratio of the steering. The travel environment may be a road, a temperature, and an atmospheric pressure in the travel environment of the vehicle.

The simulator control unit 109 is software that controls the real-time simulator 101, and controls execution, stop, and the like of simulation. Further, the simulator control unit 109 outputs a simulation result of the real-time simulator 101 to the log data acquisition unit 118 as log data.

The simulation CG drawing unit 110 is software that draws the simulation result of the real-time simulator 101 by computer graphics (CG).

The parameter set creation unit 117 is software that creates the position jump determination parameter set 119.

The display unit 112 is a liquid crystal display provided in the computer 102. The display unit 112 displays operation screens of the simulation model creation unit 111, the simulation definition file creation unit 116, the parameter set creation unit 117, and the simulator control unit 109, in addition to a CG video drawn by the simulation CG drawing unit 110. The operation unit 113 is a keyboard and a mouse of the computer 102.

Next, a series of simulation processes will be described with reference to FIG. 4. First, the simulator control unit 109 downloads the simulation model data stored in the simulation model data recording unit 114 and the simulation definition file 115 to the real-time simulator 101, whereby generating each model in the simulation model MD.

Specifically, the environment model MD1 that simulates the travel environment, the vehicle model MD2 that simulates the actual vehicle, and the sensor model MD3 may be generated. The environment model MD1 is a model that defines a road, a planimetric feature, a surrounding vehicle, a pedestrian, and a driver. The environment model MD1 reproduces the road, planimetric feature, and the like based on the downloaded simulation definition file 115, and outputs the satellite positioning position signal to the vehicle position detection device U1. The vehicle model MD2 is a model that defines the vehicle motion of the own vehicle. The vehicle model MD2 outputs vehicle information, such as a vehicle speed, a steering angle, a yaw rate, and a lateral acceleration, and outputs the gyro sensor signal to the vehicle position detection device U1. The sensor model MD3 is a model that defines a sensor attached to the own vehicle. The sensor model MD3 outputs sensor information of a lane and an object viewed from the own vehicle to the autonomous driving ECU 1. These road, planimetric feature, surrounding vehicle, own vehicle, and the like are virtually reproduced by the real-time simulator 101.

Next, a user of the autonomous driving simulator 100 controls the real-time simulator 101 through the simulator control unit 109, and executes calculation of the simulation model MD in the real-time simulator 101. A calculation result of the simulation model MD is output to the autonomous driving ECU 1 via the CAN conversion unit 107 and the CAN 103, and is output to the vehicle position detection device U1 via the CAN 103, the serial bus conversion unit 108, and the serial bus 105.

As a result, the user can input the vehicle information and the sensor information of the own vehicle traveling on the road to the autonomous driving ECU 1 based on the simulation result, and input the vehicle information, the satellite positioning position signal, and the gyro sensor signal to the vehicle position detection device U1. Therefore, a test executed by the actual vehicle can also be executed by the autonomous driving simulator.

On the other hand, the vehicle position detection device U1 outputs the own-vehicle position and the surrounding map to the autonomous driving ECU 1 based on the vehicle information, the satellite positioning position signal, and the gyro sensor signal. The autonomous driving ECU 1 recognizes a surrounding situation of the own vehicle based on the vehicle information and the sensor information in addition to the own-vehicle position and the surrounding map input from the vehicle position detection device U1, and controls the vehicle based on the recognized surrounding situation of the own vehicle. The autonomous driving ECU 1 controls the autonomous driving of the own vehicle in the simulation based on an autonomous driving control signal output to the vehicle model MD2.

The processing process of the model control and simulation data generation performed by the autonomous driving simulator 100 and the vehicle control performed by the autonomous driving ECU 1 and the vehicle position detection device U1 has been described above.

The autonomous driving simulator 100 further includes the parameter set creation unit 117. The parameter set creation unit 117 is used to create a parameter set in which a plurality of thresholds for so-called position jump determination to determine whether or not a position jump distance is allowable are set. Here, the threshold for the position jump determination will be described.

Figure 5:
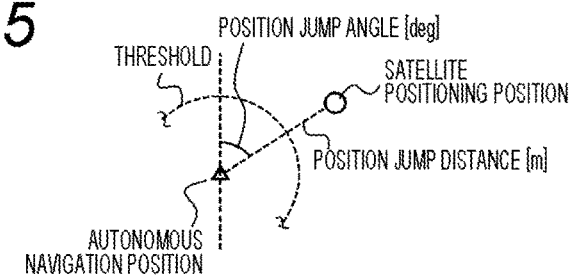
FIG. 5 is a view for describing a threshold for allowing a positional difference between a satellite positioning position and an autonomous navigation position.

FIG. 5 is a view for describing a threshold for allowing a positional difference between a satellite positioning position and an autonomous navigation position. In FIG. 5, a triangle indicates the autonomous navigation position, and a circle indicates the satellite positioning position.

A relationship between the autonomous navigation position and the satellite positioning position is expressed by a position jump angle [deg] and a position jump distance [m] as an example of the "positional difference". Whether or not the satellite positioning position has caused a position jump can be determined by comparing the position jump distance with the threshold. In the example of FIG. 5, the position jump distance is larger than the threshold. Therefore, it is determined that the satellite positioning position is not allowable, and it is confirmed that the position jump has occurred.

FIG. 6 is a flowchart illustrating parameter set creation processing.

The computer 102 executes the parameter set creation processing. The parameter set creation processing is a process of creating a parameter set in which a plurality of thresholds for allowing a position jump distance for each vehicle speed are set per vehicle characteristic. In the parameter set creation processing, a state where the autonomous driving ECU 1 executes inadvertent vehicle control due to the influence of the position jump of the satellite positioning position signal is simulated, and a relationship between the position jump and the inadvertent vehicle behavior is calculated based on log data which is a result of the simulation. Next, in the parameter set creation processing, allowable position jump angle and distance are calculated based on the log data to be used as thresholds for the position jump determination while referring to the relationship between the position jump and the inadvertent vehicle behavior. In this manner, an object of the parameter set creation processing is to create the parameter set to be mounted on the vehicle position detection device U1. Each step will be described hereinafter.

First, the computer 102 creates the simulation definition file 115 necessary for the travel simulation of the self-driving vehicle (S601). The simulation definition file 115 is created by the simulation definition file creation unit 116. The processing here is executed by the user's input, and the environment model MD1, the vehicle model MD2, and the sensor model MD3 are defined by the simulation definition file 115.

Next, the computer 102 causes the real-time simulator 101 to reproduce the definition of simulation created in S601. That is, the computer 102 executes a scenario of FIG. 7 while changing a position jump distance for each vehicle speed, each position jump angle, and each position jump timing, and calculates simulation results as a log data group (S602).

Next, the computer 102 analyzes the log data group calculated in S602, and sets a threshold of the position jump determination that allows a positional difference for each vehicle speed (S603).

Next, the computer 102 creates a parameter set from the threshold that has been set in S603, and stores the parameter set in the computer 102 (S604). As described above, one parameter set can be created for one vehicle characteristic by executing the parameter set creation processing of FIG. 6. Thereafter, when a parameter set having a different vehicle characteristic is created, the computer 102 repeatedly executes the parameter set creation processing of FIG. 6 after the vehicle motion definition section of the simulation definition file creation unit 116 updates the vehicle characteristic of the vehicle model MD2.

FIG. 7 is a scenario table illustrating a content of a simulated scenario.

The scenario table may include a number 701, a segment 702, and a content 703 as item values (or column values which is similarly applied hereinafter). The number 701 is an identifier for identifying the scenario. The segment 702 is a segment name of the scenario. The content 703 is a content of the scenario. For example, for the number "1", the segment is "initial setting", and the content is "initialize simulation and start recording log data".

Next, a series of operations in S602 will be described with reference to FIGS. 7, 8, 9, and 10.

FIG. 8 is a view illustrating autonomous driving travel reproduced by the simulator.

First, when the initial setting (number 701: "1") of the segment 702 in the scenario of FIG. 7 is executed, a road and an own vehicle are defined in simulator system coordinates (X-coordinate, Y-coordinate, and Z-coordinate) illustrated in FIG. 8, and then, the computer 102 starts recording log data of the simulation. Next, when the computer 102 executes traveling of the segment 702 (number 701: "2"), the own vehicle starts traveling by a driver model. Next, when an autonomous driving mode of the segment 702 is switched (number 701: "3"), the computer 102 switches the control of the own vehicle from the driver model to the autonomous driving ECU 1. Here, since the correct satellite positioning position signal is transmitted to the vehicle position detection device U1 without occurrence of the position jump, the own vehicle travels along a lane of the road without any problem as indicated by an arrow (own-vehicle proceeding direction) in FIG. 8. Next, when the computer 102 executes position jump application (number 701: "4") of the segment 702, a position jump set in the scenario is applied to the satellite positioning position signal, and the satellite positioning position signal with the position jump is transmitted to the vehicle position detection device U1.

When the computer 102 stops the segment 702 (number 701: "5"), the autonomous driving mode is canceled, and the own vehicle stops. Next, when the end of the segment 702 (number 701: "6") is executed, the computer 102 ends the log data recording and saves the log data in the recording unit R. The series of operations of step S602 have been described as above. The series of operations in S602 are repeated until necessary log data is obtained by changing the position jump setting and the vehicle speed of the own vehicle. Note that an object of the vehicle position detection device U1 used here is to acquire the inadvertent vehicle behavior caused by the influence of the position jump as the log data without processing, and thus, the processing of position jump determination described in FIG. 5 is omitted.

FIG. 9 is a view illustrating a position jump of autonomous driving travel reproduced by the simulator, and FIG. 10 is a view schematically illustrating a relationship between a steering angle and a lateral acceleration.

In the example of FIG. 9, a simulation result when the satellite positioning position is instantaneously shifted to the right side of a road due to the position jump will be described. The computer 102 sets a position jump angle [deg] and a position jump distance [m] with respect to a correct satellite positioning position (dashed circle) without occurrence of the position jump, and defines the position jump of the satellite positioning position (black circle). Here, the computer 102 sets a start timing and an end timing of the position jump and forms (instantaneous, intermittent, and continuous) of the position jump. In a scene of FIG. 9, the autonomous driving ECU 1 recognizes that an own-vehicle position has shifted to the right side of the road, and performs vehicle control so as not to deviate from a lane on which the own vehicle travels, so that steering is controlled to the left side as indicated by an arrow in FIG. 9, and inadvertent vehicle behavior as illustrated in FIG. 10 occurs. A threshold for position jump determination is set to suppress such inadvertent vehicle behavior.

FIG. 11 is a view schematically illustrating the position jump distance and the lateral acceleration when the position jump occurs.

For example, the lateral acceleration is calculated by gradually increasing the position jump distance while setting a vehicle speed, the position jump angle, and a position jump timing to constant values. In FIG. 11, the two-dot chain line is the lateral acceleration when the position jump distance is 1 m, the one-dot chain line is the lateral acceleration when the position jump distance is 2 m, and the solid line is the lateral acceleration when the position jump distance is 3 m.

The lateral acceleration (two-dot chain line) when the position jump distance is 1 m falls within an allowable range, and there is a sufficient margin up to an allowable value. The lateral acceleration (one-dot chain line) when the position jump distance is 2 m falls within the allowable range, and a margin up to the allowable value is small. The lateral acceleration (solid line) when the position jump is 3 m exceeds the allowable range. As the threshold for the position jump determination, the maximum position jump distance within the allowable range is adopted. Here, the threshold for the position jump determination is set to 2 m. The above operations are repeated while changing the vehicle speed, the position jump angle, and the position jump distance, thereby calculating the optimum threshold for each condition. Note that the allowable value in this example may be determined in consideration of the entire self-driving vehicle and inadvertent vehicle behavior that can be tolerated by an occupant.

FIG. 12 is an example of a parameter set table.

An example of the parameter set table in FIG. 12 is a parameter set in which a vehicle characteristic is "A" among a plurality of parameter sets. In each parameter set, a threshold of the position jump distance set for each position jump angle is set per vehicle speed.

According to this configuration, even if there is no input of the GNSS signal and no reaction of the gyro sensor, the autonomous driving travel can be simulated by connecting the autonomous driving ECU 1 and the vehicle position detection device U1 to the autonomous driving simulator 100 and executing the simulation. Further, the autonomous driving simulator 100 can be made to arbitrarily simulate a position jump to input the satellite positioning position signal to the vehicle position detection device U1, and the inadvertent vehicle behavior of the autonomous driving ECU 1 caused by the position jump can also be simulated in the simulation. That is, the threshold and the parameter set for the position jump determination can be efficiently calculated by the simulator by calculating the position jump distance between the satellite positioning position and the autonomous navigation position and comparing the calculated position jump distance with the threshold. Therefore, it is possible to reduce the cost and man-hours required for a traveling test of a prototype self-driving vehicle in the related art.

Next, the own-vehicle position correction unit 10 of the vehicle position detection device U1 will be described.

Figure 13:
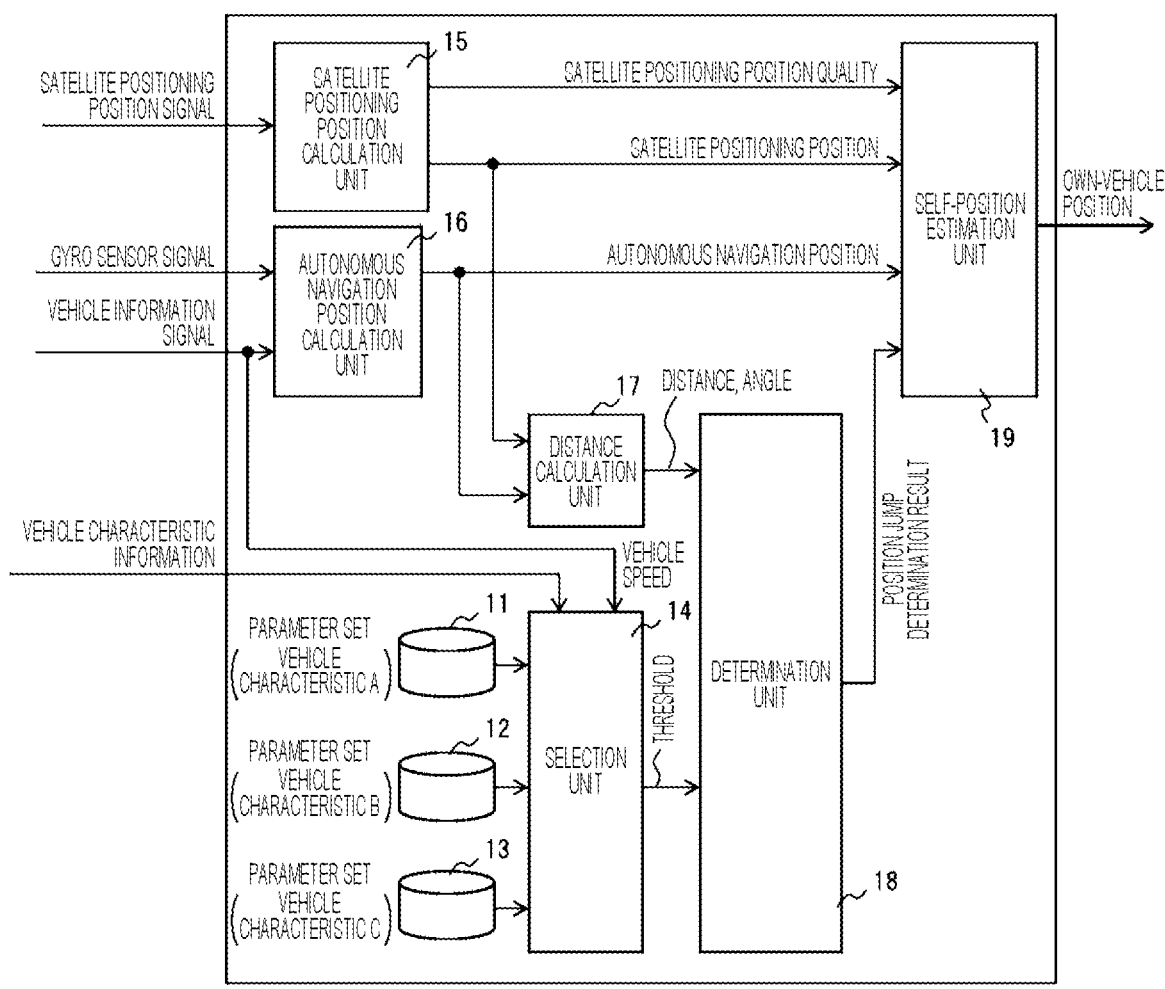
FIG. 13 is a configuration diagram of an own-vehicle position correction unit.

FIG. 13 is a configuration diagram of the own-vehicle position correction unit.

The own-vehicle position correction unit 10 includes a satellite positioning position calculation unit 15, an autonomous navigation position calculation unit 16, a distance calculation unit 17 as an example of a "positional difference calculation unit", parameter sets 11 to 13 as examples of a "recording unit", a selection unit 14, a determination unit 18, and a self-position estimation unit 19.

The satellite positioning position calculation unit 15 receives the satellite positioning position signal from the satellite positioning position reception unit 3, and calculates a satellite positioning position quality and a satellite positioning position based on the received satellite positioning position signal. The satellite positioning position arithmetic unit 15 outputs the calculated satellite positioning position quality to the self-position estimation unit 19, and outputs the satellite positioning position to the distance calculation unit 17 and the self-position estimation unit 19. The autonomous navigation position calculation unit 16 calculates an autonomous navigation position based on the gyro sensor signal of the gyro sensor unit 4 and the vehicle information signal from the vehicle, and outputs the calculated autonomous navigation position to the distance calculation unit 17 and the self-position estimation unit 19. The distance calculation unit 17 compares the satellite positioning position with the autonomous navigation position to calculate a position jump distance and a position jump angle, and outputs the calculated position jump distance and position jump angle to the determination unit 18.

The parameter set 11 (vehicle characteristic A), the parameter set 12 (vehicle characteristic B), and the parameter set 13 (vehicle characteristic C) are parameter sets created by the parameter set creation processing of FIG. 6. The parameter set is read from the computer 102 according to the vehicle characteristic, and is written and used in a memory of the vehicle position detection device U1.

The selection unit 14 selects and outputs optimum parameter set and threshold based on the vehicle information and vehicle characteristic information. Specifically, the selection unit 14 selects a parameter set based on the vehicle information, and selects a threshold from the selected parameter set based on the vehicle information. The determination unit 18 determines a position jump based on the position jump distance, the position jump angle, and the threshold, and outputs a position jump determination result to the self-position estimation unit 19. Specifically, the determination unit 18 outputs the satellite positioning position when the position jump distance is within the threshold, and outputs the autonomous navigation position to the self-position estimation unit 19 when the position jump distance is out of the threshold. The self-position estimation unit 19 calculates an own-vehicle position based on signals of the satellite positioning position quality, the satellite positioning position, the autonomous navigation position, and the position jump determination result, and outputs the calculated own-vehicle position to the autonomous driving ECU 1.

Figure 14:
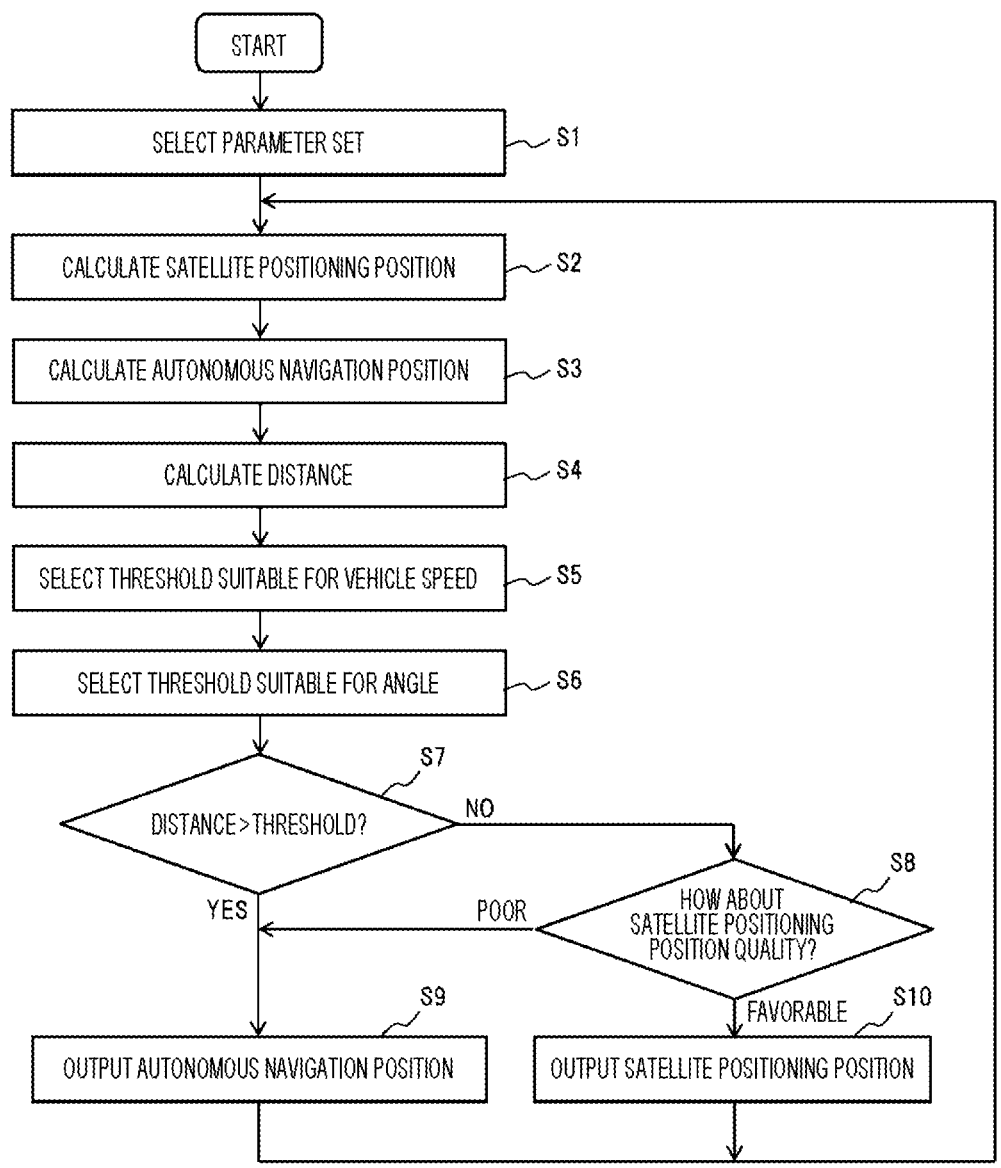
FIG. 14 is a flowchart illustrating own-vehicle position correction processing.

FIG. 14 is a flowchart illustrating own-vehicle position correction processing. Each step will be described hereinafter.

The own-vehicle position correction processing is executed by the own-vehicle position correction unit 10. First, the selection unit 14 selects an optimum parameter set according to a vehicle characteristic from among a plurality of parameter sets written in the memory (S1). Since the parameter set is provided per vehicle characteristic, for example, information indicating a vehicle type, a model, or the like is acquired based on the vehicle characteristic information, and the parameter set 11 (vehicle characteristic A) is selected when it is determined that the vehicle characteristic A is optimal.

Next, the satellite positioning position calculation unit 15 calculates the satellite positioning position quality the satellite positioning position based on the satellite positioning position signal (S2).

Next, the autonomous navigation position calculation unit 16 calculates the autonomous navigation position based on the gyro sensor signal and the vehicle information signal (S3).

Next, the distance calculation unit 17 compares the satellite positioning position with the autonomous navigation position to calculate the position jump distance and the position jump angle (S4).

Next, the selection unit 14 selects a set of thresholds suitable for the vehicle speed from the parameter set selected in S1 based on the vehicle speed included in the vehicle information signal (S5).

Next, the determination unit 18 selects one suitable threshold from the set of thresholds selected in S5 based on the position jump angle input from the distance calculation unit 17 (S6).

Next, the determination unit 18 executes position jump determination of comparing the position jump distance from the distance calculation unit 17 with the threshold selected in S6 to determine whether or not the position jump distance is within the threshold, and outputs a result to the self-position estimation unit 19 (S7). Here, when the position jump distance is larger than the threshold (S7: YES), it is determined that the satellite positioning position is an unallowable value, and the processing proceeds to S9. When the position jump distance is smaller than the threshold (S7: NO), it is determined that the satellite positioning position is an allowable value, and the processing proceeds to S8.

When the position jump distance is smaller than the threshold (S7: NO), the self-position estimation unit 19 determines whether the reception accuracy of the satellite positioning position reception unit 3 is favorable based on the satellite positioning position quality (S8). The self-position estimation unit 19 determines that the satellite positioning position is the unallowable value and proceeds to S9 when determining that the quality is poor (S8: poor), and determines that the satellite positioning position is the allowable value and proceeds to S10 when determining that the quality is favorable (S8: favorable).

When the position jump distance is larger than the threshold (S7: YES), the self-position estimation unit 19 selects the autonomous navigation position, outputs the autonomous navigation position to the autonomous driving ECU 1, and then, returns to S2 (S9).

When determining that the satellite positioning position quality is favorable (S8: favorable), the self-position estimation unit 19 selects the satellite positioning position, outputs the satellite positioning position to the autonomous driving ECU 1, and then, returns to S2 (S10).

According to the embodiments of the present invention, the plurality of parameter sets in which the thresholds for allowing the position jump distance for each vehicle speed are optimized per vehicle characteristic are stored, and thus, the position jump determination according to the vehicle characteristic on which the vehicle position detection device U1 is mounted can be executed. That is, the vehicle control executed by the autonomous driving control system can reduce the inadvertent vehicle behavior without being affected by the vehicle characteristic, and thus, the reliability and safety of the self-driving vehicle can be further improved, and the comfort for the occupant in the self-driving vehicle can be further improved.

Incidentally, the present invention is not limited to the above-described embodiments, but includes various modifications. For example, the above-described embodiments have been described in detail in order to describe the present invention in an easily understandable manner, and are not necessarily limited to those including the entire configuration that has been described above. Further, addition, deletion, or substitution of other configurations can be made with respect to some configurations of a certain embodiment.

Figure 15:
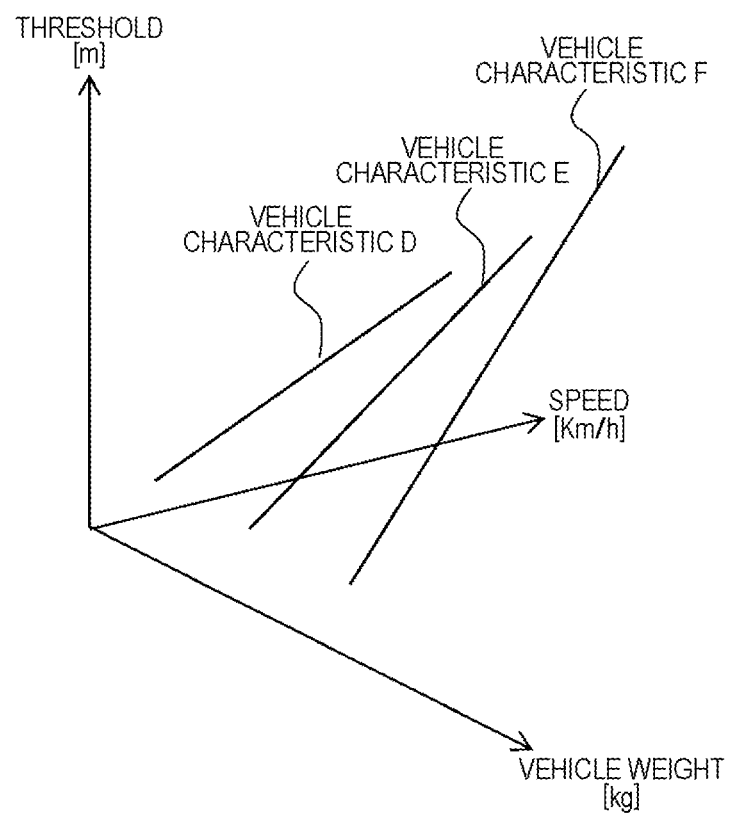
FIG. 15 is a view illustrating a parameter set of a 3D map.

FIG. 15 is a view illustrating a parameter set of a 3D map.

For example, the parameter sets in FIGS. 12 and 13 are tables classified per vehicle characteristic. Without being limited thereto, for example, as illustrated in FIG. 15, the parameter set of the 3D map in which variables are a vehicle weight, a speed, and a threshold may be stored for each of vehicle characteristics D to F, and an optimum vehicle characteristic may be selected based on the variables in the 3D map.

Further, information indicating a vehicle type, a model, or the like is acquired from vehicle characteristic information to select a parameter set in S1 of FIG. 14. Without being limited thereto, for example, a parameter set designated by the selection unit 14 may be selected when the vehicle characteristic information includes a content for designating the parameter set. In addition, a plurality of parameter sets may be stored for different vehicle weights for the same vehicle. For example, there may be a case where one person gets in the vehicle, a case where two persons get in the vehicle, a case where three persons get in the vehicle, a case where four persons get in the vehicle, and a case where heavy articles are mounted on a trunk. In this case, a weight sensor may be provided in a seat and a trunk of the vehicle, and an optimum parameter set may be selected by determining the number of passengers and a status of cargo loaded in the trunk from vehicle characteristic information. In this case, it is preferable to use the 3D map illustrated in FIG. 15.

Further, the processing returns to S2 in S9 and S10 in FIG. 14. The processing may be configured to return to S1 in S9 and S10 without being limited thereto Further, the satellite positioning position signal and the gyro sensor signal of the autonomous driving simulator 100 are input to the switching unit 2 of the vehicle position detection device U1 in the configuration diagram of FIG. 4. Alternatively, the satellite positioning position signal and the gyro sensor signal may be processed, and intermediate data that can be handled inside the own-vehicle position correction unit 10 may be directly input from the autonomous driving simulator 100 to the own-vehicle position correction unit 10. For example, a CAN ID of the intermediate data may be assigned to the vehicle information signal of the CAN 103 and directly input from the autonomous driving simulator 100 to the own-vehicle position correction unit 10, In this case, the switching unit 2 may be omitted.

Further, the autonomous driving ECU 1 and the own-vehicle position detection device U1 are configured as separate devices in the configuration example of FIG. 4. Alternatively, the autonomous driving ECU 1 and the own-vehicle position detection device U1 may be provided in one device.

REFERENCE SIGNS LIST 2 switching unit
11 parameter set (vehicle characteristic A)
12 parameter set (vehicle characteristic B)
13 parameter set (vehicle characteristic C)
14 selection unit
15 satellite positioning position calculation unit
16 autonomous navigation position calculation unit
17 distance calculation unit
18 determination unit
101 real-time simulator
102 computer
117 parameter set creation unit
118 log data acquisition unit
119 position jump determination parameter set
MD2 vehicle model
U1 vehicle position detection device

The invention claimed is:
1. A vehicle position detection device comprising:
a computer configured with a non-transitory computer-readable medium and configured to carry out processing to perform operations comprising:
receiving a satellite positioning position signal of a vehicle and calculating a satellite positioning position of the vehicle;

receiving an autonomous navigation position signal of the vehicle and calculating an autonomous navigation position of the vehicle;

calculating a positional difference between the satellite positioning position and the autonomous navigation position;

storing a plurality of parameter sets in which a plurality of thresholds for allowing the positional difference for each speed of the vehicle are set per vehicle characteristic;

selecting a parameter set corresponding to the vehicle characteristic from the plurality of stored parameter sets; and outputting the satellite positioning position when the positional difference is within a threshold, and outputting the autonomous navigation position when the positional difference is out of the threshold.

2. The vehicle position detection device according to claim 1, wherein the operations further comprise:

switching the satellite positioning position signal and the autonomous navigation position signal to simulation signals.

3. The vehicle position detection device according to claim 1, wherein the vehicle characteristic is a vehicle type of the vehicle.

4. A parameter set creation device for vehicle position detection, comprising:

a computer configured to carry out processing to cause to be inputted a positional difference between a satellite positioning position signal and an autonomous navigation position signal of a vehicle to a vehicle model in a real-time simulator and output log data related to a position jump of the vehicle; and a non-transitory computer-readable medium of the computer, the computer-readable medium being configured to store, based on the log data, a plurality of parameter sets in which a plurality of thresholds that allow a positional difference for each speed of the vehicle are set per vehicle characteristic.

5. The parameter set creation device for vehicle position detection according to claim 4, wherein the computer is further configured to carry out processing to change the vehicle characteristic of the vehicle model.

6. The parameter set creation device for vehicle position detection according to claim 4, wherein the vehicle characteristic is a vehicle type of the vehicle.

\* \* \* \* \*